Figure 1:
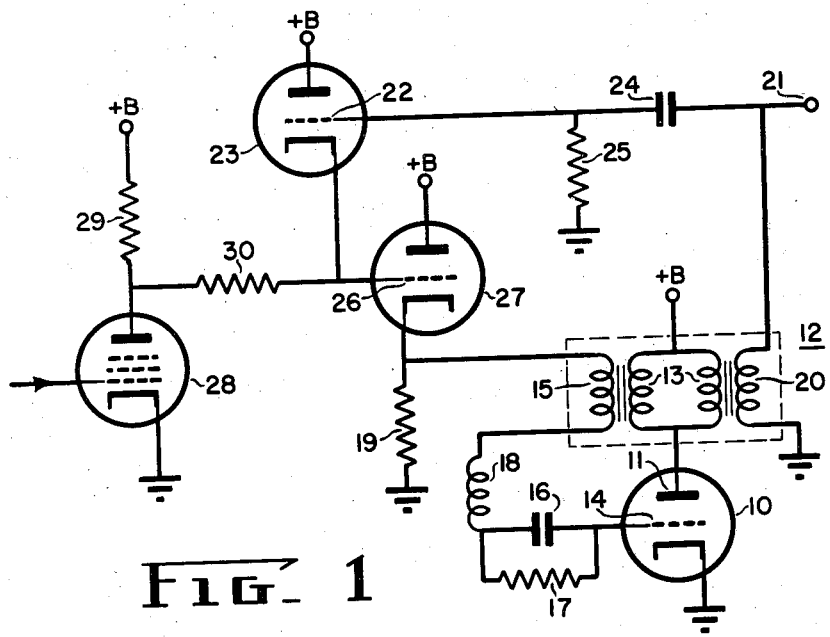

Inventor
HAROLD GOLDBERG
By Robert T. Killman
Attorney

Patented May 10, 1949

2,470,027

UNITED STATES PATENT OFFICE 2,470,027

PULSE-TIME MODULATOR

Harold Goldberg, Towson, Md., assignor to Bendix Aviation Corporation, Towson, Md., a corporation of Delaware Application February 21, 1947, Serial No. 730,090

9 Claims. (Cl. 332—14)

This invention is directed to pulse-time modulation. More specifically it is directed to an arrangement for producing pulse-position modulation of the output of a blocking oscillator in accordance with an applied control signal.

The pulse time modulating system is the following one. It is proposed to sample a message, $f(t)$, having an upper bound to its amplitude, M, in the following fashion. To $f(t)$ is added a positive fixed component, V, greater than or equal to M. The resulting function, $f(t)+V$, is to be sampled as follows. A function $Ee^{-t/RC}$ is generated where E is greater than $M+V+K$ where K is some arbitrary constant. Consider the instant $t=0$. The exponential has the value E and $f(t)+V$ is $f(0)+V$. The exponential discharge begins and is allowed to continue until $Ee^{-t/RC}$ has the same value as $f(t)+V+K$. At this instant a pulse of length δ is generated for transmission, and the exponential generator re-initiated to start another exponential discharge from the value E after a time δ. The next intersection of the exponential and $f(t)+V+K$ gives rise to another pulse of length δ and another exponential discharge starting from a value E after a time δ, and so on. This process represents successive solutions of the equation $$f(t)+V+K=Ee^{-t/RC}$$

This process may also be thought of, however, as the process of successive solutions of the equation $$f(t)+V-Ee^{-t/RC}=-K$$

This equation may be solved successively by an adaptation of the blocking oscillator. If $-K$ volts is the grid firing voltage of a blocking oscillator which causes its grid condenser to charge to $-E$ volts after each firing cycle, and the voltage $f(t)+V$ is added to this voltage so that the grid voltage is the sum of $f(t)+V$ and the grid condenser voltage, the blocking oscillator successively solves the required equation. The only real problem is to insure that the grid condenser is always charged to a fixed voltage, $-E$, after each firing cycle.

It is, therefore, an object of this invention to provide a blocking oscillator wherein the grid condenser is always charged to a fixed voltage after each firing cycle.

Figure 2:
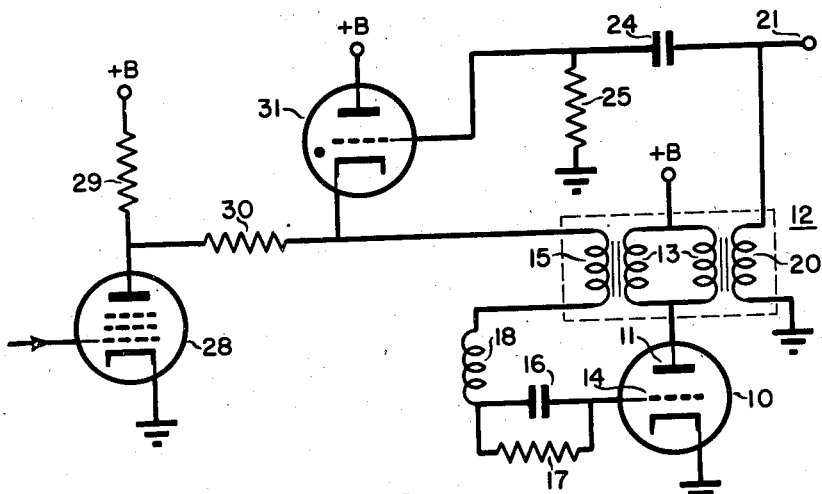

In the drawings,

Fig. 1 illustrates the preferred embodiment of this invention comprising a pulse-time modulated pulse generator, and Fig. 2 illustrates a simplified embodiment of the Fig. 1 arrangement.

Referring now to Fig. 1, there is illustrated a blocking oscillator comprising a vacuum tube 10, the anode 11 of which is connected through the anode windings 13 of a blocking oscillator transformer 12 to a source of positive voltage indicated +B. The control electrode 14 of the tube 10 is connected to the control electrode winding 15 of the transformer 12 through a filter comprising a condenser 16, forming a parallel R. C. circuit with a resistor 17, and an inductor 18. The other terminal of the winding 15 is connected to ground through a resistor 19. The output winding 20 of the transformer 12 is connected between an output terminal 21 and ground.

The control electrode 22 of a second vacuum tube 23 is connected to the output terminal 21 through a condenser 24, and to ground through a resistor 25. The anode of the tube 23 is directly connected to a source of voltage indicated +B, and the cathode thereof is connected to the control electrode 26 of a third tube 27. The cathode of the tube 27 is connected to the junction of the winding 15 and the resistor 19. The anode of the tube 27 is connected to a source of voltage +B.

The anode of a fourth vacuum tube 28 is connected to a source of voltage +B through a resistor 29 and to the junction of the cathode of the tube 23 and the control electrode 26 through a resistor 30.

Upon consideration it will be manifest that the portion of the above-described arrangement designated by the reference characters 10 to 21 inclusive comprises a conventional blocking oscillator capable of being synchronized to an external control signal which might be injected at the junction of the resistor 19 and the winding 15, or, expressed in another way, across the resistor 19.

This, in fact, is the method of synchronizing used in the present arrangement, for the resistor is the output load impedance of the cathode-follower driver comprising the tube 27 which is, in turn, driven by the amplifier comprising the tube 28. Signals applied to the control electrode 26 of the cathode follower stage appear across the resistor 19 in the conventional manner, and it is the amplitude of this signal voltage, together with the time constant of the condenser-resistor network 16, 17 which determines the instant of operation of the blocking oscillator as the charge on the condenser 16 decreases.

The condenser 16 charges to a fixed voltage during each output pulse due to the instantaneous conduction of the tube 23, the control electrode 22 of which receives a portion of the output signal from the output terminal 21 through the coupling network comprising the condenser 24 and the resistor 25. The conduction of the tube 23 effectively clamps the control electrode 26 to the voltage +B during the blocking oscillator pulse, and the voltage across the resistor 19 is brought to a fixed reference value during each cycle. This permits the condenser 16 to charge to a fixed potential each time it charges, irrespective of the magnitude of the signal voltage being supplied by the tube 28 at that instant.

In the Fig. 2 arrangement, a three electrode thyratron 31 is shown as the charging impedance for the condenser 16. The thyratron 31 is normally in a non-conductive state, but "fires" during the output pulse.

What is claimed is:

1. In combination, a blocking oscillator having an input circuit; a source of modulating voltage; means applying said voltage to said input circuit to control the recurrence frequency of the output impulses of said oscillator; and means for establishing a reference voltage in said input circuit at the termination of each cycle of the output of said oscillator; the last named means comprising a source of said reference voltage, means constituting a normally interrupted coupling path between the last named source and said input circuit, and means utilizing the output of said oscillator to complete said path during each impulse of said output.

2. In combination, a blocking oscillator having an input circuit, a source of modulating voltage, means applying said voltage to said input circuit to control the recurrence frequency of the output impulses of said oscillator, and means for establishing a reference voltage level in said input circuit, the last named means comprising a source of voltage of said reference level and a circuit coupling said reference voltage source to said input circuit, said coupling circuit comprising a normally non-conducting space discharge device and means applying the output of said oscillator to said device to render it conducting during each impulse of said output.

3. In combination, a blocking oscillator, a source of modulating voltage, means applying said voltage to the input of said oscillator to control the recurrence frequency of the output impulses thereof, a source of reference voltage, means coupling said source of reference voltage to the input of said oscillator, a switching means normally interrupting said coupling means and means applying the output of said blocking oscillator to said switching means whereby said coupling means is completed during each impulse in the output of said oscillator.

4. In combination, a blocking oscillator, a source of modulating voltage, means applying said voltage to the input of said oscillator to control the recurrence frequency of the output impulses thereof, a source of reference voltage, means coupling said source of reference voltage to the input of said oscillator, said coupling means including the space discharge path of an electric discharge device having a control electrode, and means applying the output of said oscillator to said control electrode, whereby said space discharge path is completed during each impulse of the output of said oscillator.

5. A pulse-position modulated pulse generator comprising in combination a blocking oscillator; said oscillator including a vacuum tube having a control electrode, and a condenser connected to said control electrode and having the output of said tube coupled thereto whereby said condenser is charged during the generation of an output impulse by said oscillator; a source of modulating voltage; means coupling said source to said condenser whereby the recurrence frequency of the output impulses of said oscillator becomes a function of said modulating voltage; and means establishing a reference voltage level at said condenser at the termination of each impulse of the output of said oscillator, the last named means comprising an electric discharge device having an anode, a cathode and a control electrode, said anode being maintained at said reference voltage, said cathode being coupled to said condenser and said control electrode of said device having coupled thereto the output of said oscillator, said device being non-conductive except during the impulses of the output of said oscillator.

6. A pulse-position modulated pulse generator as claimed in claim 5, said electric discharge device being a gas-filled electron discharge tube.

7. A pulse-position modulated pulse generator as claimed in claim 5, wherein the means coupling the source of modulating voltage to the condenser comprises an electron discharge tube having a cathode and a control electrode, said cathode being connected to said condenser and said source being coupled to said control electrode, and wherein the cathode of the electric discharge device is connected to said control electrode.

8. A pulse-position modulated pulse generator comprising a blocking oscillator having an input circuit; a source of modulating voltage; means applying said voltage to said input circuit to control the recurrence frequency of the output impulses of said oscillator; and means for establishing a reference voltage in said input circuit at the termination of each cycle of the output of said oscillator; the last named means comprising a source of reference voltage, means constituting a normally interrupted coupling path between the last named source and said input circuit, said path including an electron discharge tube having a control electrode and a cathode, said control electrode being coupled to the last named source and said cathode being connected to said input circuit, and means utilizing the output of said oscillator to complete said path during each impulse of said output.

9. A pulse-position modulated pulse generator comprising a blocking oscillator having an input circuit; a source of modulating voltage; a source of reference voltage; an electron discharge tube having a control electrode and a cathode, means connecting said cathode to said input circuit, means including an impedance connecting said source of modulating voltage to said control electrode, means coupling said source of reference voltage to a point on the last named connecting means between said impedance and said control electrode, said coupling means including the space discharge path of a normally non-conducting electric discharge device, and means applying the output of said oscillator to said discharge device to render the same conducting during each impulse of the output of said oscillator.

HAROLD GOLDBERG.

REFERENCES CITED

The following references are of record in the file of this patent:

UNITED STATES PATENTS

| Number | Name | Date |
|---|---|---|
| 2,230,926 | Bingley | Feb. 4, 1941 |
| 2,266,154 | Blumlein | Dec. 16, 1941 |
| 2,398,097 | Kent | Apr. 9, 1946 |
| 2,409,577 | Matson | Oct. 15, 1946 |

Disclaimer 2,470,027.—*Harold Goldberg*, Towson, Md. PULSE-TIME MODULATOR. Patent dated May 10, 1949. Disclaimer filed June 8, 1950, by the assignee, *Bendix Aviation Corporation*.

Hereby enters this disclaimer to claims 1 to 5, inclusive, of said patent.
[*Official Gazette July 4, 1950.*]